United States Patent
Makino et al.

[11] Patent Number: 5,881,342
[45] Date of Patent: Mar. 9, 1999

[54] ROTATIONAL BODY DRIVING APPARATUS AND AN IMAGE FORMING APPARATUS IN USE THEREWITH

[75] Inventors: Toru Makino; Tadashi Miwa; Naoto Tokutake; Satoshi Hamaya, all of Hachioji, Japan

[73] Assignee: Konica Corporation, Tokyo, Japan

[21] Appl. No.: 46,963

[22] Filed: Mar. 24, 1998

[30] Foreign Application Priority Data

Mar. 27, 1997 [JP] Japan ...................................... 9-074849

[51] Int. Cl.⁶ .................................................. G03G 15/00
[52] U.S. Cl. ................................................................. 399/167
[58] Field of Search ............................ 399/167; 198/780, 198/835, 781.07; 74/574, 411

[56] References Cited

U.S. PATENT DOCUMENTS

| | | | |
|---|---|---|---|
| 2,387,775 | 10/1945 | Salomon | 74/574 |
| 5,357,231 | 10/1994 | Miwa et al. | 399/36 |
| 5,420,664 | 5/1995 | Miwa et al. | 399/167 |
| 5,528,348 | 6/1996 | Miwa et al. | 399/167 |
| 5,570,160 | 10/1996 | Miwa et al. | 399/116 |
| 5,669,046 | 9/1997 | Yoshida et al. | 399/167 |
| 5,708,933 | 1/1998 | Nogami et al. | 399/167 |
| 5,791,201 | 8/1998 | Kang | 74/574 |

FOREIGN PATENT DOCUMENTS

| | | |
|---|---|---|
| 6-130872 | 5/1994 | Japan . |
| 6-130874 | 5/1994 | Japan . |
| 6-249321 | 9/1994 | Japan . |
| 6-294453 | 10/1994 | Japan . |
| 7-281500 | 10/1995 | Japan . |
| 7-302025 | 11/1995 | Japan . |
| 7-325445 | 12/1995 | Japan . |
| 7-325446 | 12/1995 | Japan . |
| 8-54047 | 2/1996 | Japan . |
| 8-63041 | 3/1996 | Japan . |
| 8-115041 | 5/1996 | Japan . |
| 8-202205 | 8/1996 | Japan . |
| 8-202206 | 8/1996 | Japan . |
| 8-220966 | 8/1996 | Japan . |

*Primary Examiner*—Matthew S. Smith
*Attorney, Agent, or Firm*—Frishauf, Holtz, Goodman, Langer & Chick

[57] ABSTRACT

An image forming apparatus having a rotational body. The apparatus includes: the rotating body such as a photoreceptor drum; a driver for driving the rotating body; the first member, provided in a driving transmission path of the driving force, for transmitting the driving force from the driving source to the rotating body, and for elastically deforming itself so as to control a natural frequency value of a driving system including the rotating body and driving source; and the second member, provided in the driving transmission path of the driving force, for controlling damping characteristics of the driving system.

24 Claims, 15 Drawing Sheets

ROTATIONAL BODY DRIVING APPARATUS AND AN IMAGE FORMING APPARATUS IN USE THEREWITH

BACKGROUND OF THE INVENTION

The present invention relates to an image forming apparatus which forms an image on the rotating photoreceptor through a digital system.

In an electrophotographic copying machine or printer, an electrostatic latent image is formed on the surface of a rotating cylindrical photoreceptor or of a running belt-shaped photoreceptor, then, the formed electrostatic latent image is developed with toner, and the toner image thus developed is transferred onto and fixed on a recording sheet to obtain an image.

Now, let it be assumed that a driving roller which makes the cylindrical photoreceptor of the apparatus representing a photoreceptor drum to rotate and makes the belt-shaped photoreceptor to run is called a rotational body.

When there is caused speed variation (speed fluctuation) on a photoreceptor which is supposed to rotate at a constant speed, small pitch banding phenomenon takes place, and the jitters and image irregularities are caused on the outputted image. This appears especially conspicuously in an electrophotographic technology of a digital system wherein writing on a photoreceptor is conducted through scanning by a semiconductor laser, and speed variation in the sub-scanning direction in the writing system is caused by the speed variation of rotation of the photoreceptor, causing delicate deviation of writing lines in their intervals, resulting in a factor to lower image quality sharply.

With regard to technologies for improving accuracy in driving a rotational body which is supposed to rotate at a constant speed, there are many proposals which are roughly divided into the following two categories.

One of the two categories is one wherein a flywheel is incorporated in the driving system, and TOKKAIHEI Nos. 7-281500 and 8-202205 disclose those wherein a conventional flywheel is easily mounted or dismounted. Further, TOKKAIHEI Nos. 6-130872, 6-130874, 7-302025 and 8-202206 disclose technologies wherein a flywheel is provided in a rotational body. In addition, TOKKAIHEI Nos. 8-63041, 8-115041, and 8-220966 disclose technologies wherein frequency response of a rotational body are detected and thereby, moment of inertia of a flywheel is normalized in connection with vibrating frequency.

The other of the two categories is one wherein vibration in the rotational direction of the drive transmitting system is absorbed by using gears and timing belt pulleys in which elastic members are provided on the half way of the rotational body driving system. Concrete examples are shown in TOKKAIHEI Nos. 6-249321, 6-294453, 7-325445, 7-325446 and 8-54047.

As stated above, in prior art, use of a flywheel has been the most effective technical means for improving accuracy in driving a rotational body, but there has been a theoretical problem that a large apparatus is required and large torque is also required in the rise of rotation. Further, since the flywheel itself is one to reduce rotational vibration by its rotational kinetic energy, when obtaining its effect in the case of low speed rotation of a rotational body, it is necessary to use a flywheel having a larger diameter compared with the rotational body. Therefore, for the purpose of avoiding a large-sized apparatus, one has had to be contented with a functional limit even when providing a flywheel in the rotational body.

It has become popular recently to obtain a natural frequency of a driving system for a rotational body and thereby to design the driving system taking the relation with vibrating frequency into consideration, and to obtain frequency response of a rotational system focusing on a natural frequency and thereby to change a form of frequency response, namely a form of transfer functions by the design of inertial quantity to change the peak position so that the driving system may be optimum. The most serious problem in this case is that a diameter of the flywheel is required to be large or the flywheel is required to be heavy in weight, naturally in the case of a single rotational body driving system, when considering to move a natural frequency to a low frequency area. This means that, when natural frequency f of basic frequency is represented by $$f = \frac{1}{2\pi}\sqrt{\frac{K}{I}}$$

the value of natural frequency f is made small by making moment of inertia I of the rotational body to be large. (K in this case represents torsional rigidity of the driving system.)

On the other hand, improving the driving accuracy by providing elastic members on the half way of the driving system means that a vibration component in the rotational direction generated in the driving system is converted into heat in the elastic members to be diffused. Since there are no concepts of frequency response and transfer function in this case, effects of the elastic members can not be predicted depending upon vibrating frequency of the generated vibration and the structure of the driving system, resulting in different levels of effects.

However, in development of an image forming apparatus of a digital system, reproducibility of one dot line by laser writing is required strictly as performances are improved and accuracy required for the driving system has become strict rapidly. The accuracy required in this case is on the level wherein uniformity of laser writing in the sub-scanning direction can be guaranteed in connection with visual sensitivity of a visual system, and with the trend of high density recording such as 600 dpi–2400 dpi, there is required highly accurate driving of a rotational body having no speed fluctuation and satisfying a high level in which a human being can not recognize small pich banding.

For the reasons mentioned above, there are generally employed highly accurate gears, exclusive driving, and a large-sized flywheel in the scope of prior art. However, when employing a flywheel, there is no way to avoid heavy weight and a large apparatus. For providing a printer of an electrophotographic system, too, there has been proposed a structure to transmit gear driving force to a rotational body such as a photoreceptor drum through elastic members because of necessity to materialize the highly accurate driving structure which is light in weight, compact in size and low in cost. However, this technology which employs only elastic members has had a problem that a gain in a resonance area is large, and speed fluctuation in the vicinity of the resonance area and load variation adversely affect to a great extent to worsen small pich banding although the technology has shown great effects to reduce speed fluctuation which is higher than a natural frequency.

SUMMARY OF THE INVENTION

An object of the invention is to attain, with the novel structure solving the problems mentioned above, the highly accurate driving structure which is light in weight, compact in size and low in cost and is hardly affected adversely by an external disturbance, and thereby to provide a rotational body driving apparatus and an image forming apparatus which can output images with high image quality.

The rotational body driving apparatus representing the object mentioned above can be attained by:

a rotational body driving apparatus composed at least of a rotational body, a driving source to drive the rotational body, a first elastic member which transmits the rotational driving force of the driving source to the rotational body and determines a natural frequency of the driving system composed of the rotational body and the driving source through elastic deformation behavior, and of a second elastic member which is actuated by the elastic behavior of the first elastic member to increase its damping characteristics;

a rotational body driving apparatus composed of a driving gear, a rotational body which has an end surface and is connected to the driving gear on the end surface, a rigid protrusion fixed on the driving gear, a first elastic member which is fixed on the end surface of the rotational body and transmits to the rotational body the rotational driving force transmitted to the driving gear by touching the protrusion, and a second elastic member which is fixed on the end surface of the rotational body and is actuated by an elastic behavior of the first elastic member caused by contact between the first elastic member and the protrusion; and a rotational body driving apparatus composed of a driving gear, a rotational body which has an end surface and is connected with the driving gear on the end surface, a rigid protrusion fixed on the end surface of the rotational body, a first elastic member which is fixed on the driving gear and transmits to the rotational body the rotational driving force transmitted to the driving gear by touching the protrusion and a second elastic member which is fixed on the driving gear and is actuated by an elastic behavior of the first elastic member caused by contact between the first elastic member and the protrusion.

The image forming apparatus representing the object mentioned above can be attained by:

an image forming apparatus composed at least of an image carrier which carries an image, an image forming means which forms an image on the image carrier, a driving source which drives the image carrier or a rotational body holding the image carrier, a first elastic member which transmits the rotational driving force of the driving source to the image carrier or to the rotational body and determines a natural frequency of the driving system composed of the image carrier and the driving source or composed of the rotational body and the driving source, and a second elastic member which is actuated by an elastic behavior of the first elastic member and increases its damping characteristics.

Figure 2:
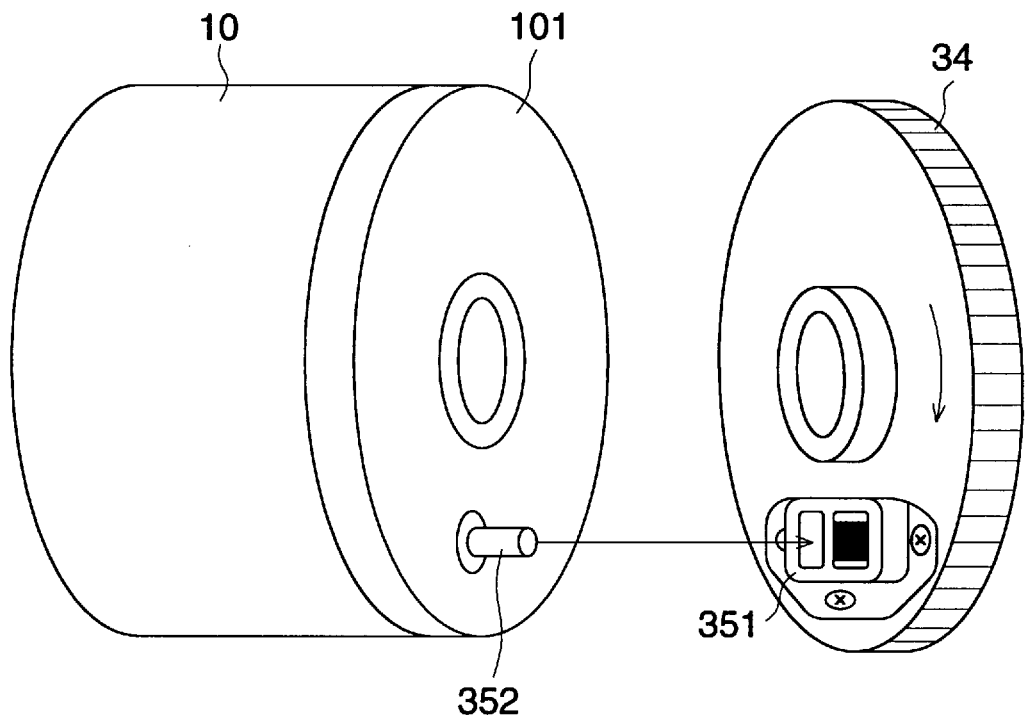
Figure 2:
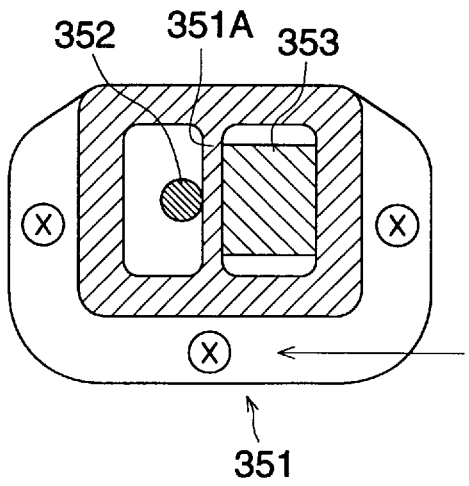
Figure 2:
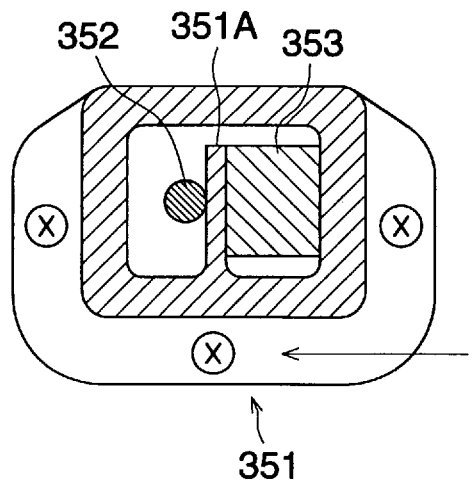

Each of FIGS. 2 (*a*)–2 (*c*) represents an illustration showing an example of a drive-transmitting section related to the invention.

Figure 3:
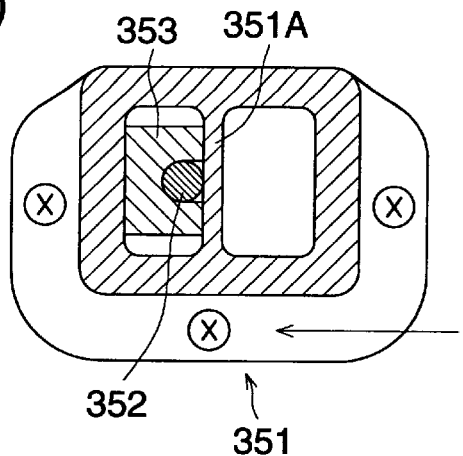
Figure 3:
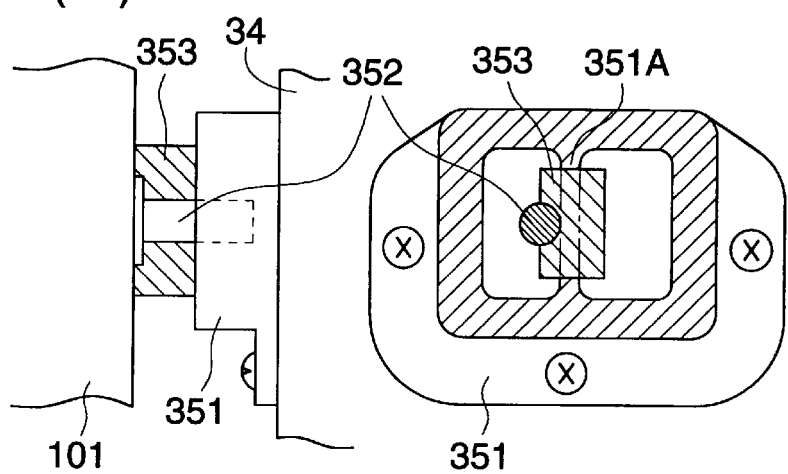
Figure 3:
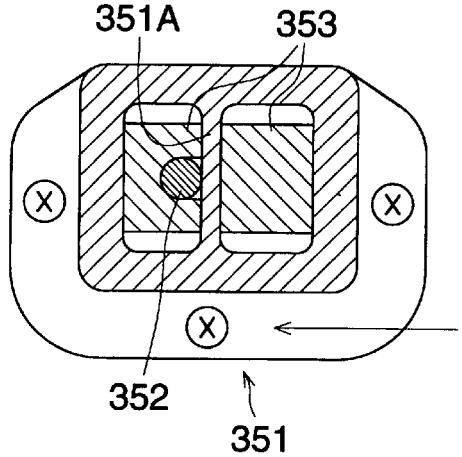
Figure 3:
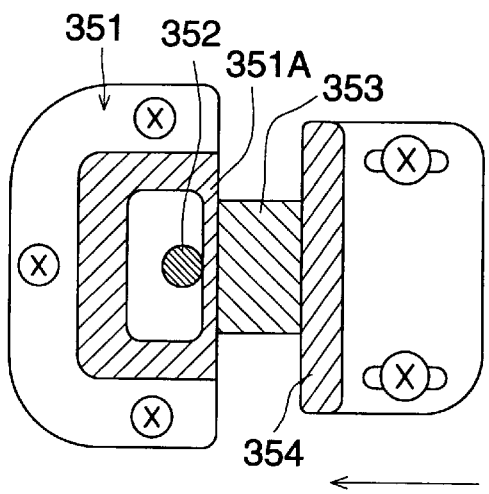

Each of FIGS. 3 (*a*)–3 (*d*) represents an illustration showing an example of installation of a viscoelastic body in drive-transmitting section.

Figure 4:
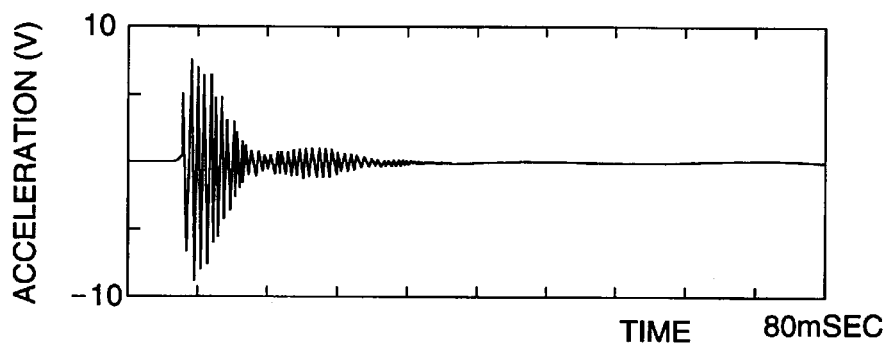
Figure 4:
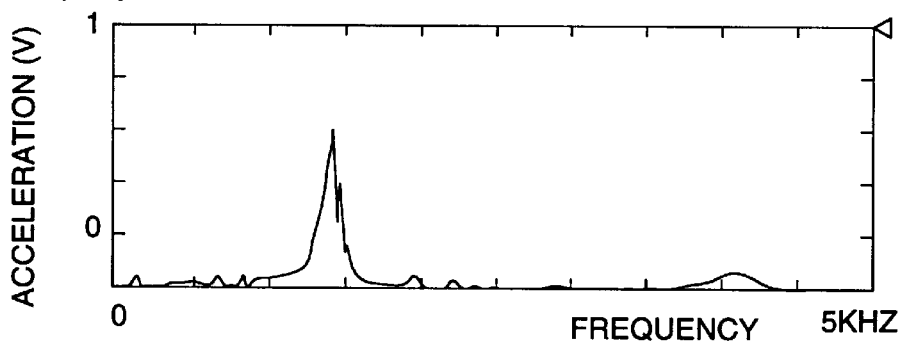

Each of FIGS. 4 (*a*) and 4 (*b*) represents measurement data of acceleration response in the case of a beam alone.

Figure 5:
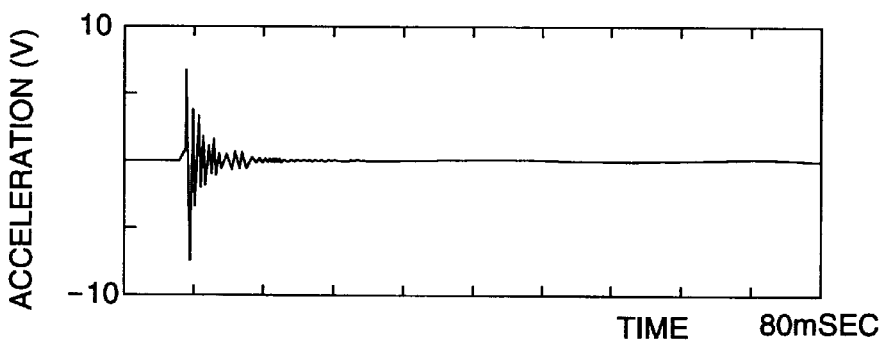
Figure 5:
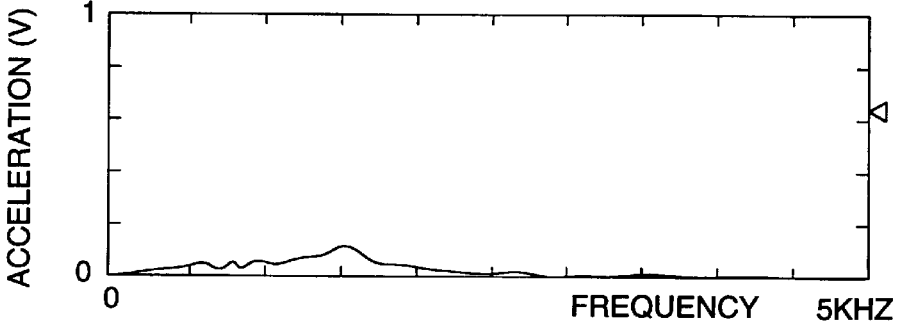

Each of FIGS. 5 (*a*) and 5 (*b*) represents measurement data of acceleration response in the case where a viscoelastic body is added to a beam.

Figure 6:
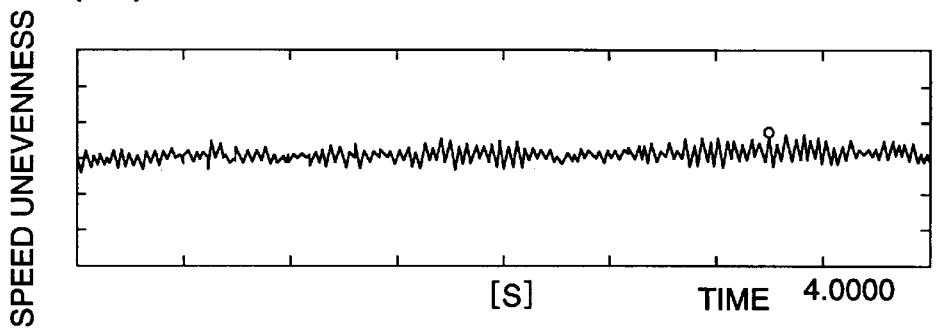
Figure 6:
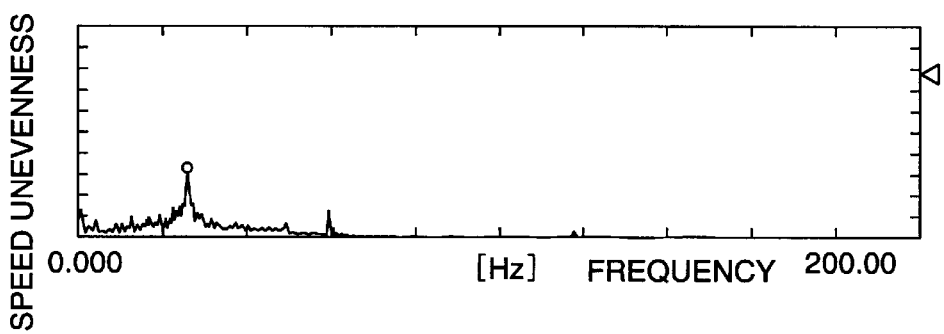

Each of FIGS. 6 (*a*) and 6 (*b*) represents measurement data of speed unevenness of a photoreceptor drum in the case of a beam alone.

Figure 7:
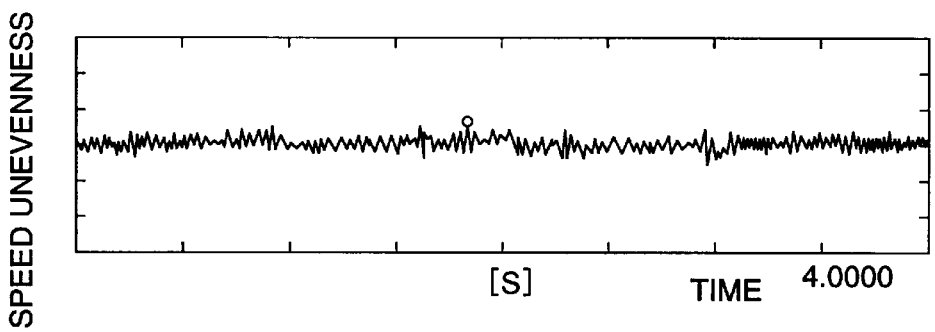
Figure 7:
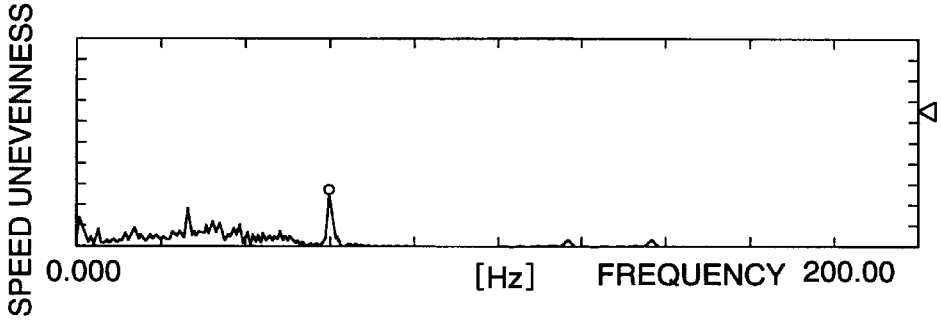

Each of FIGS. 7 (*a*) and 7 (*b*) represents measurement data of speed unevenness of a photoreceptor drum in the case where a viscoelastic body is added to a beam section.

Figure 8:
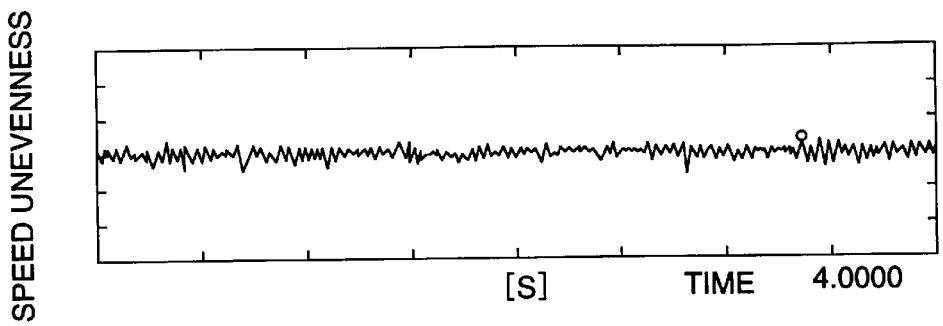
Figure 8:
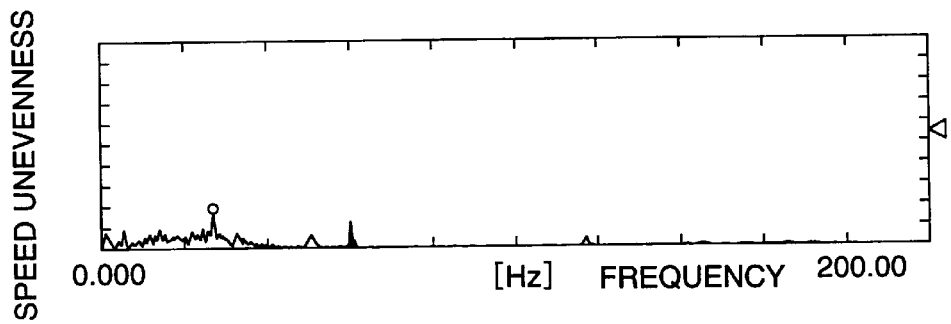

Each of FIGS. 8 (*a*) and 8 (*b*) represents measurement data of speed fluctuation of a photoreceptor drum in the case where moment of inertia are added to a viscoelastic member.

Figure 9:
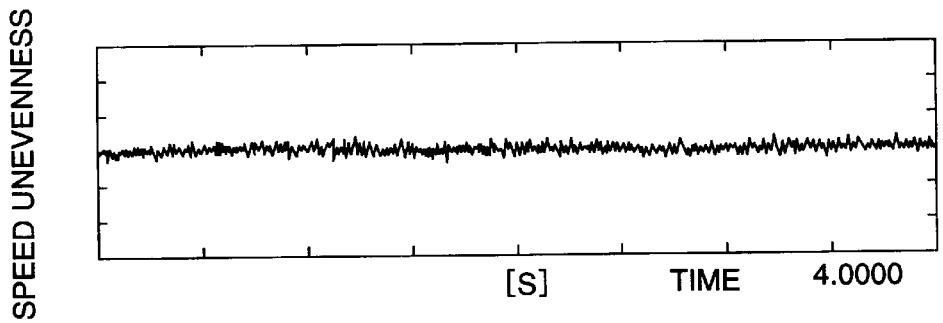
Figure 9:
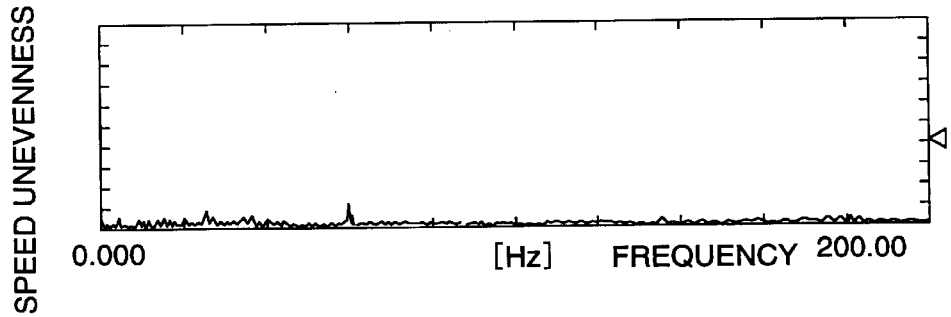

Each of FIGS. 9 (*a*) and 9 (*b*) represents speed fluctuation data of a photoreceptor drum obtained in the case where a viscoelastic body is replaced under the condition in FIGS. 8 (*a*) and 8 (*b*).

Figure 10:
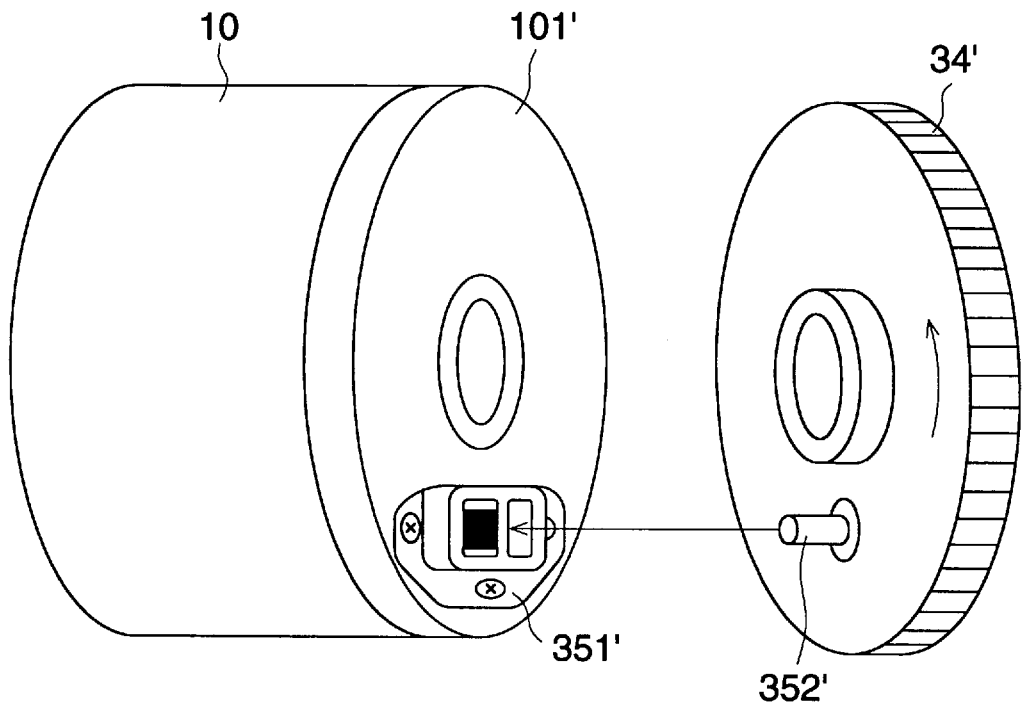
Figure 10:
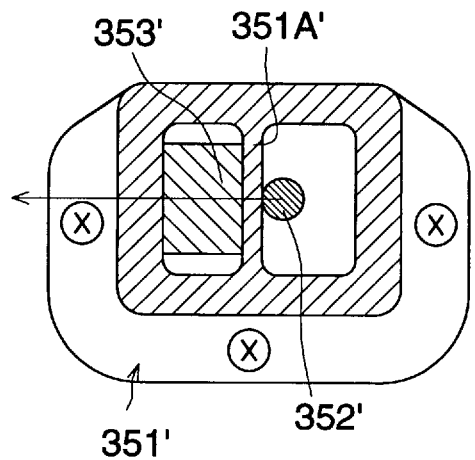

Each of FIGS. 10 (*a*) and 10 (*b*) represents an ill ustration showing another embodiment of the drive-transmitting section related to the invention.

Figure 11:
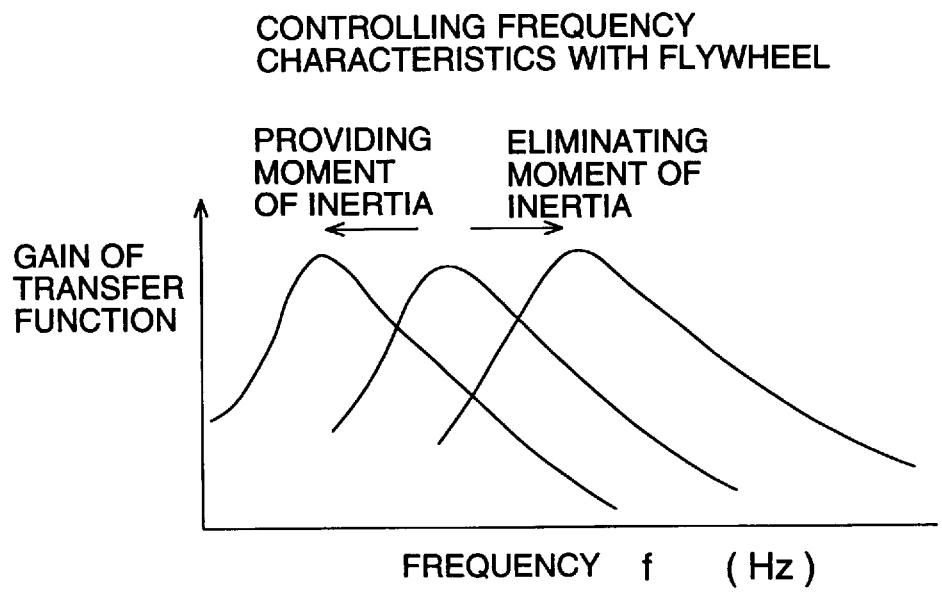
Figure 11:
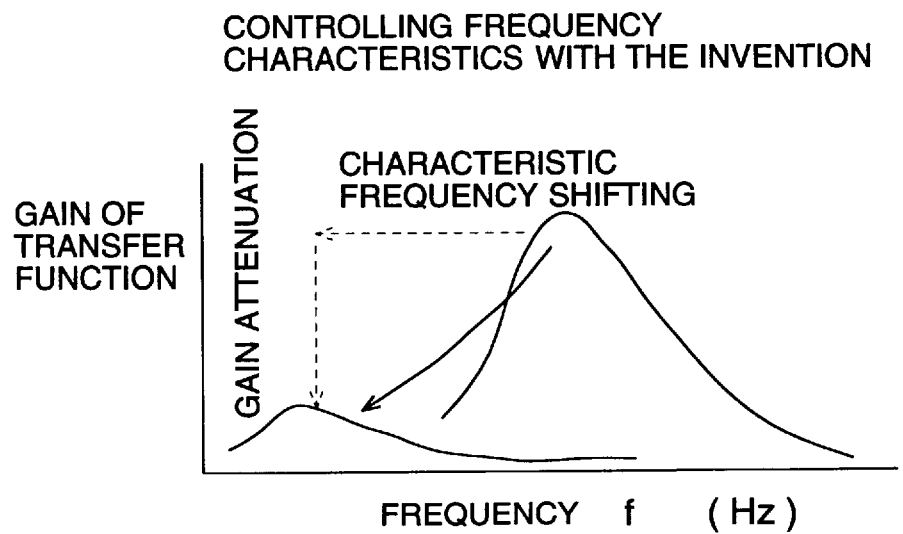

Each of FIGS. 11 (*a*) and 11 (*b*) represents an illustration related to the control of frequency response.

Figure 12:
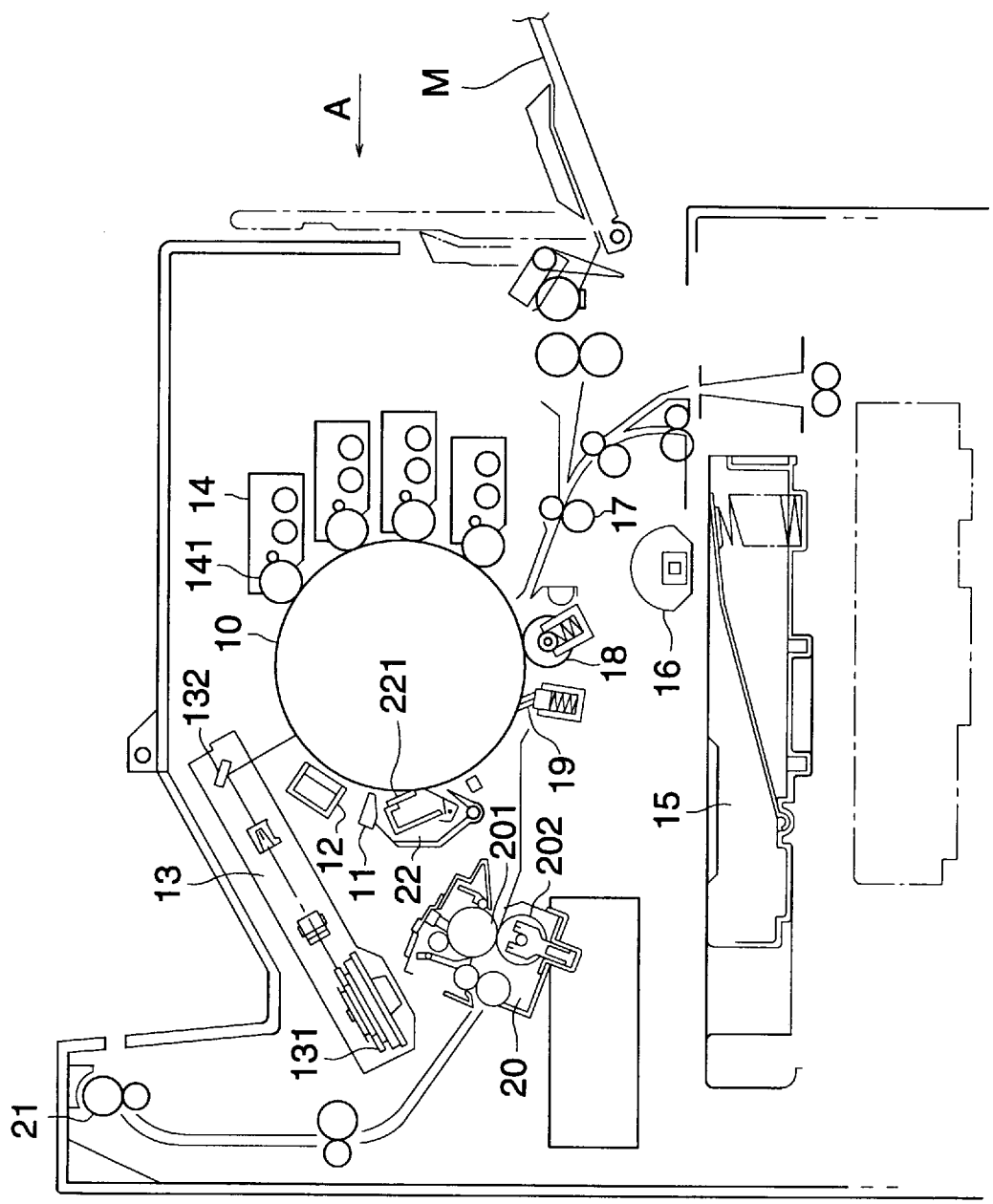

FIG. 12 is a sectional structure diagram of an image forming apparatus showing an embodiment of the invention.

Figure 13:
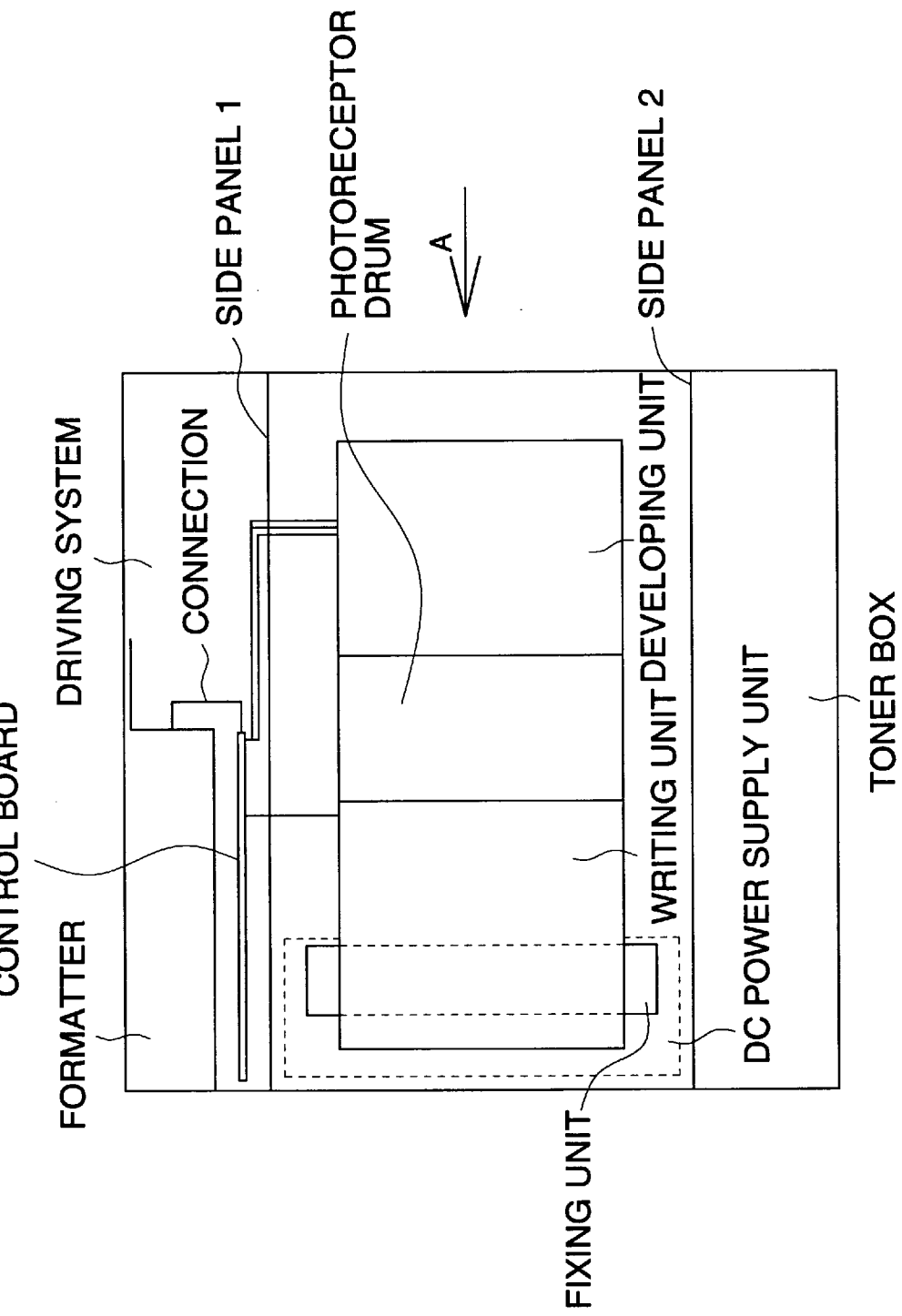

FIG. 13 is a perspective view showing a layout of each component in the aforesaid apparatus.

Figure 14:
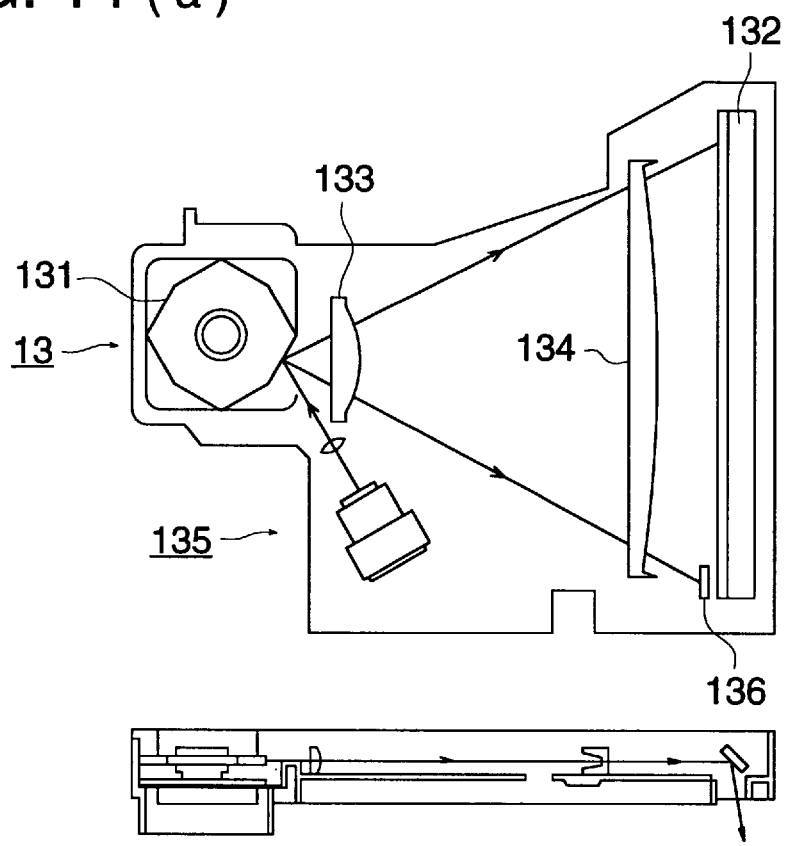
Figure 14:
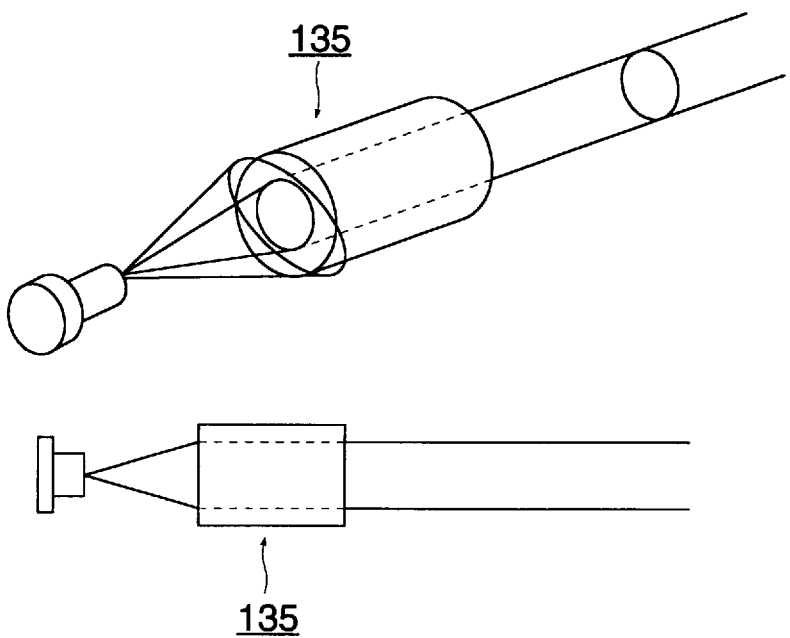

Each of FIGS. 14 (*a*) and 14 (*b*) is an illustration showing an optical system of an imagewise exposure means.

Figure 15:
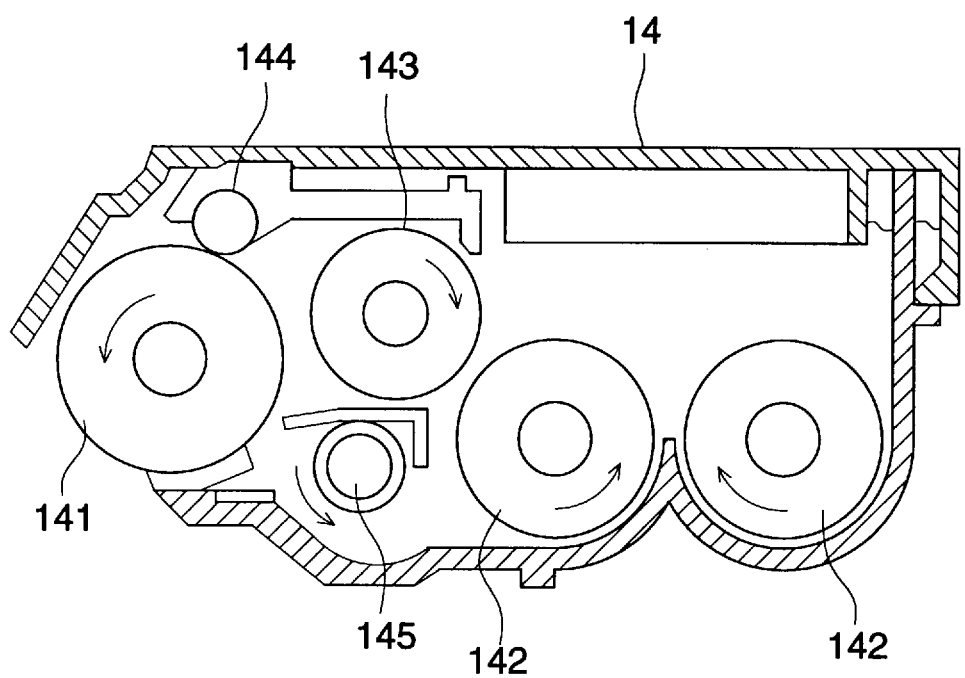

FIG. 15 is a sectional structure diagram of a developing unit.

Figure 16:
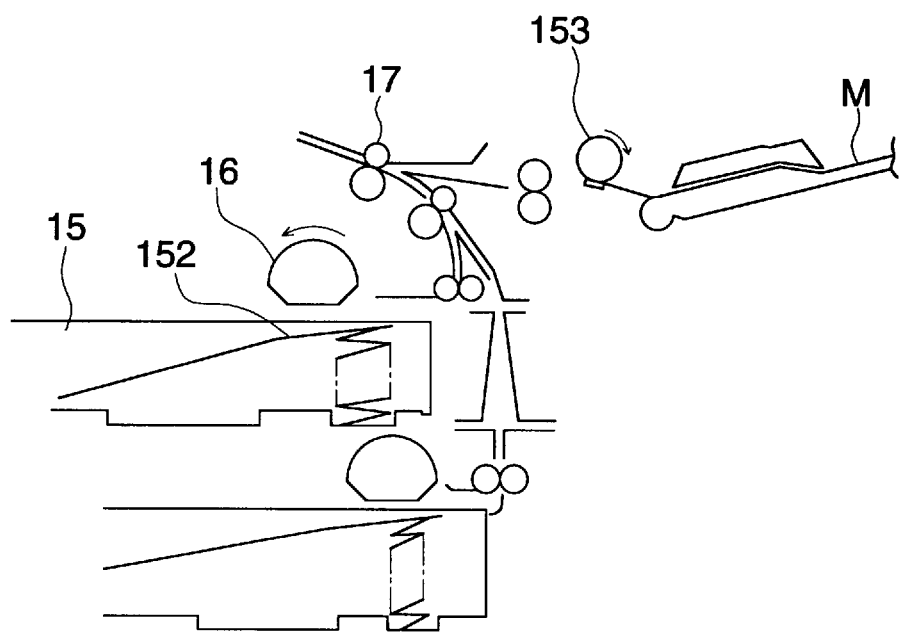
Figure 16:
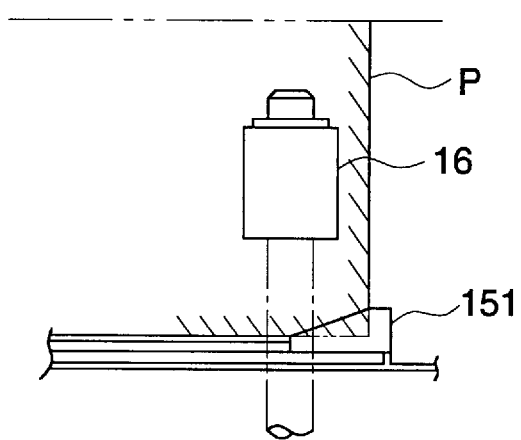

Each of FIGS. 16 (*a*) and 16 (*b*) is a diagram of primary portions of a sheet-feeding section.

Figure 17:
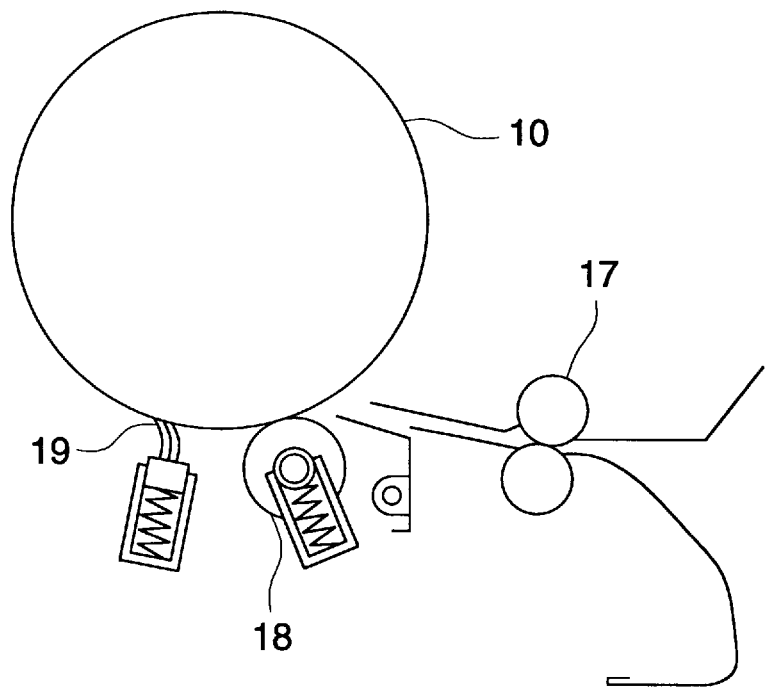

FIG. 17 is a diagram of primary portions of a transfer section.

Figure 18:
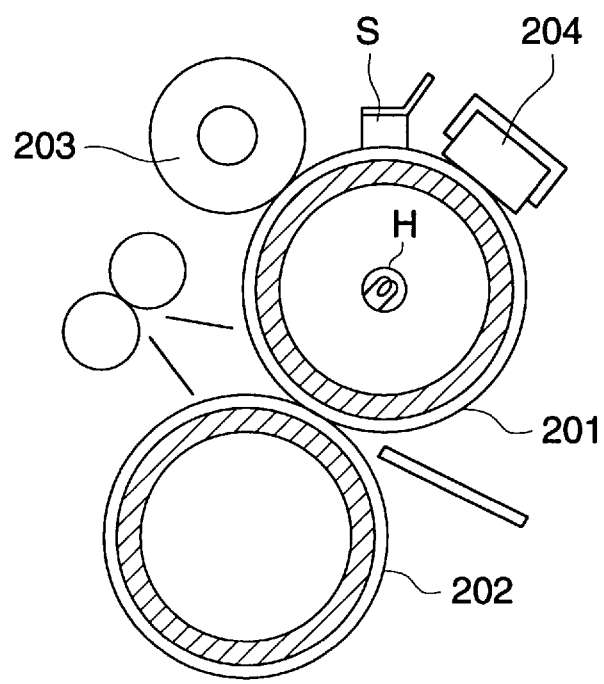

FIG. 18 is a diagram of primary portions of a fixing section.

Figure 19:
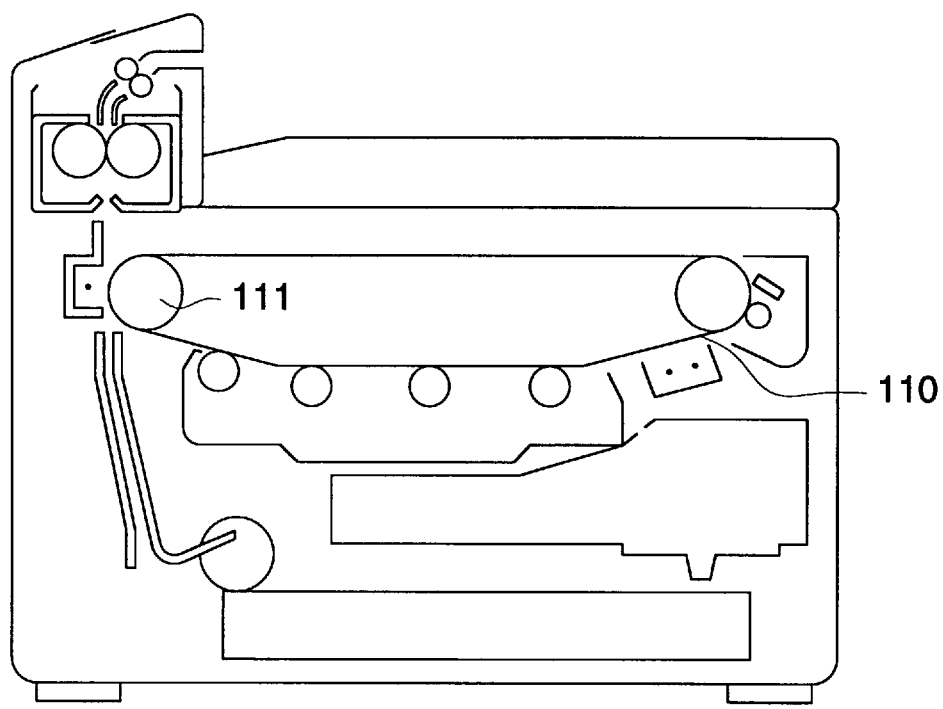

FIG. 19 is a sectional view of an image forming apparatus having a belt-shaped photoreceptor.

DETAILED DESCRIPTION OF THE INVENTION

The greatest differences between a rotational body driving apparatus of the invention stated below and that in prior art are the following two points.

1. The invention is theoretically different from those wherein a form of a transfer function in frequency response is changed by a flywheel, and it is one capable of controlling frequency response with an extremely simple structure without using a flywheel. Namely, natural frequency f has been changed by changing moment of inertia I in the prior art (see FIG. 11 (*a*)), but in the invention, frequency response can be controlled by changing torsional rigidity K of a substantial driving system.

2. The invention not only can control frequency response by changing the peak position of the frequency characteristic but also can reduce freely a magnitude of the frequency characteristic, namely, a level of a gain of the transfer function. This corresponds to the occasion wherein the peak of the transfer function is not only moved in parallel but also moved in the size direction so that the height of the transfer function is lowered (see FIG. 11 (*b*)).

Owing to the foregoing, there is offered an effect that an absolute value of a vibration in the rotational direction existing in the corresponding frequency area is sharply lowered.

Next, the structure and functions of a color image forming apparatus to which the rotational body driving apparatus of the invention is applied will be explained with reference to FIGS. 12–18.

In FIG. 12, the numeral 10 is a photoreceptor drum representing an image carrier having OPC photoreceptor coated on its drum which is grounded and is driven to rotate clockwise. The numeral 12 is a scrorotron charging unit which applies uniform charging $V_H$ to the circumferential surface of photoreceptor drum 10 by means of corona discharging conducted by a grid kept to voltage $V_G$ and a corona discharge wire. Prior to the charging conducted by scrorotron charging unit 12, the circumferential surface of the photoreceptor is neutralized by means of exposure conducted by PCL 11 in which a light emitting diode is used, so that hysteresis remaining on the photoreceptor up to the moment of the previous printing may be eliminated.

After uniform charging on the photoreceptor, imagewise exposure is conducted by imagewise exposure means 13 based on image signals. The imagewise exposure means 13 having therein an unillustrated laser diode serving as a light source for emission, rotary polygon mirror 131, f θ lens and reflecting mirror 132 which deflects a light path, conducts scanning to form a latent image on the photoreceptor 10 through the rotation (sub-scanning) of the photoreceptor 10. In the present example, exposure is applied on the area for characters to form a reversal latent image wherein the area for characters shows lower voltage $V_L$.

Around the photoreceptor drum 10, there are provided developing units 14 each housing therein developing agents composed of carrier and toner representing each of yellow (Y), magenta (M), cyan (C) and black (K), and development for the first color is conducted first by developing sleeve 141 which houses therein magnets and rotates while holding a developer. The developer is composed of a carrier having therein a core of ferrite that is coated with insulating resins and of toner whose main material is polyester to which dyes depending on a color, charge control agents, silica and titanium oxide are added, and the developer is regulated by a layer forming means to be in layer thickness (developer) of 100–600 μm on developing sleeve 141, and is conveyed to a developing area.

A clearance between the developing sleeve 141 and the photoreceptor drum 10 in the developing area is made to be 0.2–1.0 mm which is greater than the layer thickness (developer), and AC bias voltage of $V_{AC}$ and DC bias voltage of $V_{DC}$ are impressed on the clearance to be superimposed. Since $V_{DC}$ and charge of $V_H$ toner are in the same polarity, toner urged by $V_{AC}$ to leave a carrier is not stuck to the area of $V_H$ which is higher than $V_{DC}$ in terms of voltage but is stuck to the area of $V_L$ which is lower than $V_{DC}$ in terms of voltage so that image-visualization (reversal development) is conducted.

After completion of image-visualization for the first color, there is started an image forming process for the second color wherein uniform charging by scorotron charging unit 12 is conducted again, and a latent image based on image data for the second color is formed by imagewise exposure means 13. In this case, neutralizing carried out by PCL 11 in the image forming process for the first color is not conducted because toner sticking to the image area for the first color scatters due to a sudden fall of surrounding voltage.

In the photoreceptor charged again to be at voltage of $V_H$ on the entire circumferential surface of the photoreceptor drum 10, the area having thereon no image for the first color is subjected to formation of a latent image similar to that for the first color which is then developed, but the area which has thereon the image for the first color and is developed again is subjected to formation of a latent image at $V_M'$ caused by adhering toner for the first color serving as light-shielding and by charges owned by toner itself, thus, development in accordance with voltage difference between $V_{DC}$ and $V_M'$ is conducted. In the area where an image for the second color is superposed on that for the first color, intermediate voltage satisfying the relation of $V_H > V_M > V_L$ is sometimes used because if development for the first color is conducted after forming a latent image at $V_L$, the balance between the first color and the second color is lost.

For each of the third and fourth colors too, the same image forming process as for the second color is conducted, and visual images for four colors are formed on the circumferential surface of photoreceptor drum 10.

On the other hand, recording sheet P fed out of sheet-feeding cassette 15 through Woodruff roller 16 stops momentarily, and is conveyed by rotational action of sheet-feeding roller 17 to a transfer area when transfer timing is adjusted.

In the transfer area, transfer roller 18 is brought into pressure contact with the circumferential surface of the photoreceptor drum 10 in synchronization with transfer timing to nip the conveyed recording sheet P so that images of multiple colors are collectively transferred onto the recording sheet P.

Then, the recording sheet P is neutralized almost simultaneously with the foregoing by separation brush 19 which is in pressure contact, and then is separated from the circumferential surface of the photoreceptor drum 10 to be conveyed to fixing unit 20 where toner is melted and fixed by heating and pressuring respectively of heat roller 201 and pressure roller 202, and then is ejected out of the apparatus through sheet-ejection roller 21. Incidentally, the transfer roller 18 and the separation brush 19 are retreated from the circumferential surface of the photoreceptor drum 10 after the recording sheet P has passed through them to be ready for the following formation of toner images.

On the other hand, the photoreceptor drum 10 from which the recording sheet P has been separated is subjected to removing of remaining toner and cleaning both conducted through pressure contact of blade 221 of cleaning unit 22, and is further subjected to neutralizing conducted by PCL 11 and charging conducted by charging unit 12 to enter the following image forming process. Incidentally, the blade 221 is retreated from the circumferential surface of the photoreceptor drum 10 by moving immediately after the cleaning of the photoreceptor surface.

FIG. 13 shows a layout on a plane for each unit constituting the aforesaid apparatus, and the side shown with arrow mark A is a front side of the apparatus which corresponds to the side on the operation side.

A main body of the apparatus has two erected side panels 1 and 2, and between these side panels, there are incorporated a writing unit representing the imagewise exposure means 13, photoreceptor drum 10, a developing unit housing therein plural developing units 14, fixing unit 20 and a DC power supply unit. Outside the side panel 1, on the other hand, there are provided a driving system, a formatter which decodes printer command, and a control board for controlling operation sequence of a machine, and outside the side panel 2, there is arranged a toner box communicated with each developing unit 14 in a developing module.

Since the photoreceptor drum 10 and the developing module are located in the vicinity of the operation side of the apparatus, they can be drawn out to the front side of the apparatus with a simple operation in a certain structure, and when the upper portion of the main body is arranged to be opened, jam clearance in the transfer position can be done by taking out a drum carriage to its take-out position without taking the photoreceptor drum 10 and the developing module out of the main body.

Further, jam clearance at the sheet-feeding section can be done by taking the photoreceptor drum 10 and sheet-feeding cassette 15 loaded in the lower portion of the developing module out of the apparatus, and jam clearance at the sheet-ejection section can be realized by employing the structure wherein the rear and side surfaces are opened.

Characteristics of function and performance of each component constituting an image forming section in the aforesaid apparatus will be explained as follows.

(Photoreceptor)

Uniform charging on OPC photoreceptor on the circumferential surface of the photoreceptor drum 10 conducted by the scorotron charging unit 12 can be realized by the stable rotation of the photoreceptor drum 10. When charging is conducted, charging voltage is stabilized by controlling grid voltage. Specifications of a photoreceptor and its charging conditions are established as follows, an example.

Photoreceptor: OPC φ 120 Linear speed 100 mm/sec Negative charging

Charging conditions: Charging wire: A platinum wire (clad or alloy) is preferably used. $V_H$–850 V, $V_L$–50 V (Imagewise exposure)

FIG. 14 (a) represents a top view and a side view of a layout of imagewise exposure means 13, and FIG. 14 (b) is an illustration of semiconductor laser unit 135 used in the imagewise exposure means 13.

An OPC photoreceptor on the circumferential surface of photoreceptor drum 10 is charged negatively by charging unit 12 and then is subjected to exposure made by emission of semiconductor laser unit 135 of imagewise exposure means 13, whereby a latent image is formed thereon.

Image data from the formatter mentioned above are sent to a laser diode (LD) modulation circuit, and when LD of semiconductor laser unit 135 is caused to emit by modulated image signals, a beam thus emitted is projected to polygon mirror 131 through a mirror after synchronization of each scanning line is adjusted by beam index 136.

The polygon mirror 131 reflects a beam on its polygonal surfaces for scanning, and the scanning beam, after its beam form is corrected by f θ lens 133 and cylindrical lens 134, conducts primary scanning by exposing the photoreceptor through reflecting mirror 132 to form an electrostatic image.

The laser beam is converged by an optical system to a beam diameter corresponding to 600 DPI. It is therefore necessary to make a toner particle size small for obtaining images with high quality. In the present example, a toner particle size of 8 μm is used for each color. However, what is most important for users is quality of black characters, and black toner with small particle size (7 μm–11 μm) is preferable.

Those having the following structures are used as an optical system for imagewise exposure.

Polygon mirror: 6-face type, rotational frequency of 23600 rpm, supported by air bearing Focal length of lens: f=140 mm Dot clock: 20 $MH_z$ Beam diameter: approx. 60×80 μm (Developing)

FIG. 15 shows structure of developing unit 14 wherein toner supplied from the toner box is dropped in a right end portion of the developing unit and is stirred and mixed with a carrier by paired stirring screws 142 rotating in the opposite direction each other to be set to a prescribed quantity of charges (Q/M).

On the other hand, toner concentration is detected by an inductance detecting method, and an amount of toner to be supplied is controlled based on the frequency outputted through the inductance detecting method so that a toner concentration value is set to and controlled at 5%–7%.

A two-component developer thus prepared through stirring is conveyed by supply roller 143 to developing sleeve 141 where the two-component developer is made to a thin layer by layer thickness regulating member 144, and then is conveyed to a developing area on photoreceptor drum 10 to be used for reversal development of an electrostatic latent image carried out under the developing conditions stated below.

Developing clearance: 0.5 mm

Amount of toner conveyed: 20–30 mg/cm$^2$

Developing bias (AC): 2 KV, 8 $KH_z$ (DC): –750 V

Direction of developing sleeve rotation: Same direction as a photoreceptor drum in the developing area Image density adjustment: Control of rotational frequency of a developing sleeve or control of developing bias (a standard patch is formed on a photoreceptor by a laser beam, and reflection density on the patch is measured after developing for image density adjustment)

Toner concentration control: Inductance detecting method

Incidentally, by using an unillustrated toner bottle which is loaded in the toner box stated earlier as a toner hopper as it is, it is possible to make a toner supply unit to be small and simple, and by using a translucent material for forming the toner bottle, it is possible to arrange so that an amount of remaining toner can easily be recognized visually.

(Sheet feeding)

FIG. 16 shows a sheet feeding section for recording sheet P wherein the recording sheets P are loaded in sheet feeding cassette 15 on a one-side reference basis, and fanning claw 151 is provided only on the reference plane side of the recording sheet P accordingly, and Woodruff roller 16 which is of a cantilever structure is further located to be biased to the reference plane side of the recording sheet P.

In the sheet feeding section, there is provided an exclusive motor and thereby the Woodruff roller 16 is rotated in the arrowed direction to feed out, through an action of the fanning claw 151, only one uppermost sheet out of recording sheets P loaded on lifting plate 152.

The recording sheet P thus fed out of the sheet feeding cassette 15 enters a conveyance path and makes a U-turn, and immediately after the leading edge of the recording sheet P has passed through sheet feeding roller 17, an unillustrated sheet feeding sensor detects and the motor is suspended momentarily, and then the motor starts running again when timing for transfer has been synchronized, thus the recording sheet P is fed to a transfer area while keeping its prescribed angle to the surface of the photoreceptor.

On the other hand, sheet feeding by means of manual feeding is conducted by rotating manual sheet feeding table M located on the front side of an apparatus main body from the position shown with one-dot chain lines to that shown with solid lines.

The sheet fed in manually is conveyed by rotation of pickup roller 153 and then is fed to the transfer area through the process which is the same as that for a sheet fed out of the sheet feeding cassette 15.

The sheet to be fed manually includes ordinary recording sheets P of 16 lbs–24 lbs used commonly, thick papers of 36 lbs and transparencies. It is also possible to feed an envelope by mounting an exclusive feeder which is an option after removing the manual sheet feeding table M.

(Transfer)

Transfer roller 18 is movable in terms of its position for the circumferential surface of photoreceptor drum 10, and it is caused to be in pressure contact with photoreceptor drum 10 constantly for printing of monochromatic images, while it is retreated to be kept at a detached position in the course of forming color images and then is brought into pressure contact only in the course of transferring. On the other hand, separation brush 19 is brought into pressure contact with the circumferential surface of photoreceptor drum 10 and retreated therefrom while being synchronized mostly with position change of the transfer roller 18.

In the apparatus of the present example, there is used transfer roller 18 of a type wherein voltage to be impressed is +3–+4 KVDC and the roller surface is cleaned by a blade, and there is used separation brush 19 on which bias voltage having therein superimposed DC and AC is impressed.
(Fixing)

Fixing unit 20 provided in the apparatus of the present example is a fixing unit of a heat roller type wherein recording sheet P is heated and conveyed so that toner images thereon are fixed by a nip portion formed between heat roller 201 which houses therein heater H and is driven to rotate clockwise and pressure roller 202 which comes in pressure contact with the heat roller 201 to be driven to rotate.

Each of the aforesaid upper and lower roller is covered with a heat resistant tube and a nip portion is formed to be a straight line by the pressure contact, which prevents creases on the sheet surface which tend to be caused when an envelope or the like is conveyed.

Temperature on the circumferential surface of the heat roller 201 is controlled through detection conducted by temperature sensor S, and is kept within a prescribed temperature range, while stains stuck to the roller by toner fusion are removed and cleaned by cleaning roller 203 that is in pressure contact. The cleaning roller 203 is replaced with fresh one after printing of about 40000 prints. A fixing heater is made to be on a SLEEP mode when its off hours exceed a prescribed time so that it is controlled for energy conservation.

Further, when a transparency used for OHP is used as a transfer material, silicone oil is coated on the roller surface by oil pad 204 located on the circumferential surface of the heat roller 201 for the purpose of preventing diffused reflection by smoothing the toner image surface to improve transmission factor of color toner images.

Therefore, the apparatus of the present example, when its conveying speed for transfer materials is made to be switchable to three steps of 100 mm/sec, 50 mm/sec and 12.5 mm/sec, can be equipped with modes which make it possible to use transfer materials in three types of plain paper, envelopes and transparencies, and is utilized for broad applications.

By using toner which can be fused by a low temperature, the temperature set on the heat roller 201 can be as low as about 180° C., and by using sponge materials (porous PTFE coated) for the oil pad 204, an uneven pressing problem is solved and uniform oil coating can be realized.

Next, an embodiment of a driving apparatus for photoreceptor drum 10 which is a rotary body will be explained.

Figure 1:
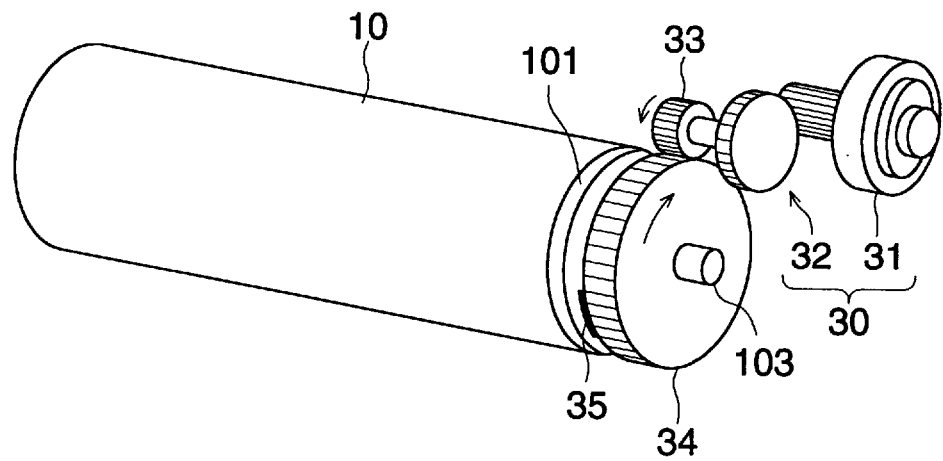
FIGS. 1 (*a*) and 1 (*b*) show respectively a perspective view and a sectional view each showing a rotational body driving mechanism.
Figure 1:
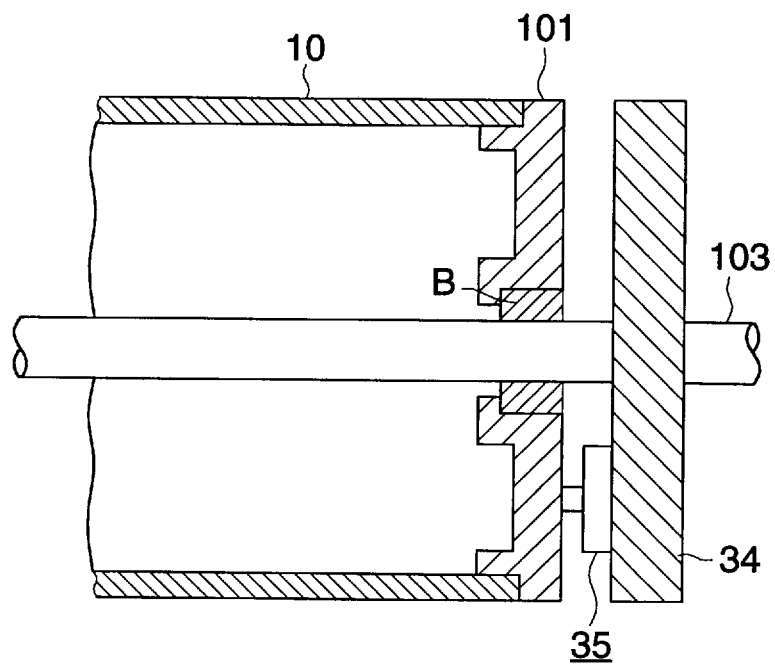

FIG. 1 (a) shows photoreceptor drum 10 and driving mechanism 30. The driving mechanism 30 is composed of driving motor 31 such as a pulse motor and of gear train 32 linked with the driving motor 31, and final gear 33 of the gear train 32 is engaged with driving gear 34 provided rotatably and coaxially with the photoreceptor drum 10.

The photoreceptor drum 10 is made of a cylindrical aluminum basic material, and the drum circumferental surface is coated with the OPC photoreceptor stated above.

Flanges 101 attached to both ends of the photoreceptor drum 10 are engaged with shaft 103. Thus, a side of the flange 101 on one side and a side of the driving gear 34 are positioned to be away from each other by a prescribed distance, and drive transmission section 35 provided between both sides transmits driving force of the driving motor 31 to the photoreceptor drum 10.

FIG. 1 (b) shows a partial section of the photoreceptor drum 10 and the driving gear 34. In the embodiment illustrated, shaft 103 is supported to be fixed on the image forming apparatus main body, and driving gear 34 is engaged with the shaft 103 through an unillustrated bearing such as, for example, an oilless bearing, and the flange 101 attached on the photoreceptor drum 10 is engaged, in the same way as in the foregoing, with the shaft 103 through bearing B. Incidentally, it is also possible to use a construction wherein the shaft 103 is supported to be rotatable for the image forming apparatus main body, and the photoreceptor drum 10 is fixed on the shaft 103.

FIG. 2 (a) is an exploded perspective view showing constitution of an embodiment of drive transmission section 35. In the drive transmission section 35 which conducts drive transmission between the driving gear 34 and the flange 101 of the photoreceptor drum 10, beam-shaped elastic body 351 having beam section 351A is provided on the end face of the driving gear 34, beam section 351A is provided to be fixed at the position which is almost in the direction of a radius of driving gear 34, and drive linking protrusion 352 which is bar-shaped and rigid is fixed on an end face of the flange 101. In the assembled state, the drive linking protrusion 352 is in contact with the position which is almost the center of the beam section 351A of the beam-shaped elastic body 351 as shown in FIG. 2 (b), and the drive linking protrusion 352 is pushed in the arrowed direction through the beam section 351A as the driving gear 34 rotates, thus, drive transmission to the photoreceptor drum 10 is carried out.

In the drive transmission section 35, there is provided viscoelastic body 353 which comes in surface contact with a point on beam section 351A which is opposite to the point where the drive linking protrusion 352 touches the beam section 351A, while being deformed with a constant compressibility. In the invention, there are provided in the drive transmission section a first elastic member (beam section 351A) which determines, through elastic deformation behavior, a natural frequency of a driving system composed of a rotational body and a driving source and a second elastic member (viscoelastic body 353) which acts on elastic behavior of the first elastic member and increases its damping characteristic, which will be explained in detail as follows.

The beam-shaped elastic body 351 in the present embodiment is a resin molding made of polyacetal (POM), and it is fixed firmly on the driving gear 34 by three screws, for example. The beam section 351A is a both-end supported beam which is fixed at its both ends and has a thickness of 1.8 mm and a length of 35 mm, and it determines natural frequency. As a material for the beam-shaped elastic body 351, there may be used selectively the elastic resin materials and metallic materials both for industrial use such as ABS resins (ABS), SUS alloys, zinc-coated steel plate (SECC-C-20/20) and aluminum alloys, in addition to those mentioned above. Further, the beam-shaped section may also be of a cantilever type shown in FIG. 2 (c), though it is in a form of a both-end supported beam in the embodiment.

For viscoelastic body 353 in the present embodiment, there are used chloroprene rubber (CR), ethylenepropyrene rubber (EPDM), silicone gel, oil-impregnated porous rubber, butyl rubber, thermoplastic elastomer, and high-function material wherein high vibration absorbing capability is added to thermoplastic resin. The viscoelastic body 353 is an elastic body whose JIS rubber hardness is in a range from 20 degrees to 100 degrees, and preferably is in a range from 40 degrees to 80 degrees, and viscoelastic bodies preferably used represent one whose dynamic dissipation factor tan δ is 0.3 or more, and preferably is 0.5 or more. The viscoelastic body 353 having the characteristics mentioned above is in surface contact, under its condition to be compressed in advance with compressibility of 1%–15%, with a certain area on the beam section 351A that is opposite to the point where drive linking protrusion 352 touches the beam section 351A.

Due to the structure mentioned above, it is possible for the viscoelastic body 353 to control the damping coefficient extremely effectively and freely on a dominant basis. In the embodiment, the viscoelastic body 353 is in contact with a portion on the beam section 351A that is opposite to the point where the drive linking protrusion 352 touches the beam section 351A as shown in FIG. 2 (b). However, it is also possible to arrange so that the viscoelastic body 353 comes in contact with a portion on the beam section 351A that is on the same side as the point where the drive linking protrusion 352 touches the beam section 351A as shown in FIG. 3 (a). It is further possible to arrange so that the viscoelastic body 353 comes in contact with a side on the side where the drive linking protrusion 352 touches the beam section 351A as shown in FIG. 3 (b). The position where the viscoelastic body 353 comes in contact with the beam section 351A is not limited to one point, but it is possible to arrange so that the viscoelastic body 353 comes in contact with the beam section 351A at two points one of which is the same as, and the other of which is opposite to a point where the drive linking protrusion 352 touches the beam section 351A as shown in FIG. 3 (c), for example.

Though the viscoelastic body 353 which is compressed in advance by 1%–15% is brought into contact with beam section 351A, it is also possible to make an arrangement wherein pressing member 354 capable of adjusting finely the distance from beam section 351A is provided separately from the beam-shaped elastic body 351 as shown in FIG. 3 (d), and the viscoelastic body 353 is set between them after obtaining appropriate compressibility of the viscoelastic body 353.

The inventors of the invention made an arrangement wherein viscoelastic body 353 made of material of CR rubber having rubber hardness of 61 degrees is used to be in contact with a reverse side of beam section 351A at compressibility of 10% with regard to photoreceptor drum 10 having moment of inertia of 27000 gcm², and whereby lowered the natural frequency of the beam section 351A from 25 Hz to 15 Hz by making the viscoelastic body 353 to touch to make the reduction of gain of transfer coefficient possible.

FIGS. 4–9 represent data showing the conditions stated above.

FIG. 4 represents data obtained through an arrangement wherein viscoelastic body 353 was removed, and a portion of a beam of beam section 351A was shaken and the acceleration response of the beam was measured, in which (a) shows data whose axis of abscissa represents time, while (b) shows data whose axis of abscissa represents frequency.

FIG. 5 shows data obtained through an arrangement wherein viscoelastic body 353 was attached on beam section 351A and a portion of the beam of the beam section 351A was shaken, in which (a) shows data whose axis of abscissa represents time, while (b) shows data whose axis of abscissa represents frequency. When FIG. 4 is compared with FIG. 5, it is observed that the gain of natural frequency is lowered in frequency area data by attachment of the viscoelastic body 353, while vibration is promptly attenuated in the time axis area data and thereby vibration characteristics are improved.

FIGS. 6–9 represent data obtained by measuring speed unevenness of photoreceptor drum 10 by a laser Doppler after applying the foregoing actually on drive transmission section 35 of an image forming apparatus. FIGS. 6a and 6b represent data obtained by removing the viscoelastic body 353. In the actual driving system, there are various factors for load variation for photoreceptor drum 10 and they are causing speed unevenness of the photoreceptor drum 10. Therefore, in the case of beam section 351A alone in FIGS. 6a and 6b, load variation affects adversely to make the gain in the vicinity of torsion natural frequency (approx. 25 Hz) to be great, and a p—p value of time axis area data is also great.

FIGS. 7a and 7b represent data obtained through an arrangement wherein viscoelastic body 353 was attached on beam section 351A. When FIGS. 7a and 7b are compared with FIGS. 6a and 6b, it is understood that when the viscoelastic body 353 is attached, the gain of resonance in a frequency area is controlled to be low in spite of load variation, a p—p value of time axis area data is kept to be small stably, and driving accuracy is improved. Data shown in FIGS. 8a and 8b represent those obtained through an arrangement wherein moment of inertia of photoreceptor drum 10 in FIGS. 7a and 7b was increased further by 12000 gcm², and when FIGS. 8a and 8b are compared with FIGS. 7a and 7b, it is understood that speed unevenness is further lowered.

FIGS. 9a and 9b show data obtained in an arrangement wherein the viscoelastic body 353 employing CR rubber in FIGS. 8a and 8b was replaced with viscoelastic body 353 employing thermoplastic elastomer having dissipation factor tan δ of 1.9 (manufacturer (Toso) ED 1920N). It is observed that the gain in the vicinity of 25 Hz is further lowered and speed evenness is improved by using the viscoelastic body whose dissipation factor is considerably great compared with that of CR rubber.

The drive transmission section 35 in the embodiment explained above is of structure (see FIG. 2) wherein beam-shaped elastic body 351 is fixed on the end face of driving gear 34, drive linking protrusion 352 is fixed on the end face of flange 101, beam section 351A of the beam-shaped elastic body 351 is brought into contact with the drive linking protrusion 352, and thereby rotation of the driving gear 34 is transmitted to the drive linking protrusion 352 through the beam section 351A. However, it is also possible to obtain the same effect through the structure which is utterly opposite to the foregoing. FIG. 10 shows the structure of drive transmission section 35' in the present embodiment, and beam-shaped elastic body 351' having thereon beam section 351A' is provided on the end face of flange 101', and the beam section 351A' is fixed to be almost in the direction of a radius of the flange 101' in terms of positional relation. On the beam section 351A', there is provided viscoelastic body 353' in a way that the viscoelastic body 353' is in contact with the beam section 351A'. On the end face of driving gear 34', there is fixed bar-shaped and rigid drive linking protrusion 352' which is in contact mostly with the central position of the beam section 351A' in the assembled state as shown in FIG. 10 (b) and it pushes the beam section 351A' in the arrowed direction as the driving gear 34' rotates, thus drive transmission to photoreceptor drum 10 is carried out.

Further, though the rotational body itself is represented by photoreceptor drum 10 in the rotational body driving apparatus explained above, the rotational body is not limited to the photoreceptor drum 10, and it is also possible to employ an image outputting apparatus wherein belt-shaped photoreceptor 110 is provided and the rotational body of the invention is represented by driving roller 111 which drives the photoreceptor 10. Even in this case, the driving roller 111 can be rotated without its speed fluctuation by applying the driving apparatus in the above-mentioned embodiment to the driving roller 111, thus, it is possible to move the photoreceptor 110 at a constant speed and thereby to improve remarkably quality of images to be outputted.

The rotational body driving apparatus of the invention further offers an excellent effect even when it is applied to a recording apparatus for recording images on a light-sensitive film with a laser beam wherein, for example, a light-sensitive film is wound around a drum-shaped rotational body and is scanned by a polygon mirror while the rotational body is rotated at a constant speed.

Further, in the rotational body driving apparatus of the invention explained above, the rotational body itself is an image carrier such as photoreceptor drum 10. However, the rotational body driving apparatus can be applied also to a rotational body employed in image forming apparatuses of other types. For example, when the invention is applied to a conveyance roller for conveying an image recording sheet, the image recording sheet can be conveyed at high conveyance accuracy and quality of images formed on the image recording sheet can be improved.

Due to the invention, natural frequency in torsion of a rotational body can be controlled freely and dominantly by the first elastic member (beam section), and an damping coefficient can be controlled freely and dominantly by the second elastic member (viscoelastic body), which improves markedly the degree of freedom in designing. Both a natural frequency of a rotational body driving system and an damping coefficient which can be set freely result in a concrete effect that speed fluctuation is lowered because of a gain of the transfer function which is in an area where the gain is originally lowered, in the area of the frequency higher than the natural frequency and the gain of the transfer function itself is lowered by the effect of an damping member, and thereby result in an effect that a resonance level in the vicinity of the natural frequency is lowered, which makes it possible to obtain an effect that speed fluctuation related to driving of a rotational body is wholly lowered efficiently and accuracy of driving a rotational body is markedly improved.

As a result, there is obtained a stable driving system which is highly resistant against speed fluctuation in the vicinity of a resonance area, vibration from a driving section for development in the case of an image forming apparatus, and against external disturbances such as variations of loads including a blade and a transfer roller.

Since the invention makes an influence of load variation and speed fluctuation to be extremely small, a rotational body and a photoreceptor drum on which an image is formed can constantly be rotated highly accurately and stably.

As a result, in an image forming apparatus, small pich banding which is a primary image trouble caused by speed fluctuation of a photoreceptor is made small extremely, and images with high image quality can be provided stably by making small pich banding to be at a level which can not be recognized by human eyes.

What is claimed is:

1. An image forming apparatus, comprising:
    a rotating body;
    a driving source for driving said rotating body;
    a first member, provided in a driving transmission path of a driving force, for transmitting said driving force from said driving source to said rotating body, and for elastically deforming itself so as to control a natural frequency value of a driving system including said rotating body and driving source; and
    a second member, provided in said driving transmission path of said driving force, for controlling damping characteristics of said driving system.

2. The image forming apparatus of claim 1, wherein said rotating body comprises a photoreceptor drum.

3. The image forming apparatus of claim 1, wherein said rotating body comprises a driving roller for driving a photoreceptor belt.

4. The image forming apparatus of claim 1, wherein damping characteristics of said driving system by effect of said second member is larger than that of said first member.

5. The image forming apparatus of claim 1, wherein said first member is provided between said driving source and said rotating body and said second member increases damping characteristics caused by said first member.

6. The image forming apparatus of claim 1, wherein said second member controls a damping coefficient of said driving system.

7. The image forming apparatus of claim 11 wherein said second member controls damping characteristics of said driving system so as to decrease vibration of said driving system.

8. The image forming apparatus of claim 1, wherein said second member decreases vibration of said first member as a part of said driving system.

9. The image forming apparatus of claim 8, wherein said second member is an elastic material whose JIS rubber hardness is in a range from 20 degrees to 100 degrees.

10. The image forming apparatus of claim 1, wherein said second member is attached to said first member.

11. The image forming apparatus of claim 10, wherein said second member is provided inside said first member.

12. The image forming apparatus of claim 11, wherein said second member is compressed at a predetermined pressure inside said first member.

13. The image forming apparatus of claim 10, wherein said second member has a surface contact with said first member.

14. The image forming apparatus of claim 1, further comprising:
    a driving force transmitting member, being rotated by said driving source, for transmitting said driving force to said rotating body wherein a rigid protrusion is provided to said driving force transmitting member; and
    wherein said first member is fixed to a side surface of said rotating body and said first member is coupled with said protrusion of said driving force transmitting member.

15. The image forming apparatus of claim 14, wherein said driving force transmitting member comprises a driving gear.

16. The image forming apparatus of claim 14, wherein said first member includes at least a beam-shaped portion, said first member is coupled with said protrusion through said beam-shaped portion, and said second member is in contact with said first member on the side other than that where said first member is coupled with said protrusion.

17. The image forming apparatus of claim 14, wherein said first member includes at least a beam-shaped portion, said first member is coupled with said protrusion through said beam-shaped portion, and said second member is in contact with said first member on a surface of the side that said first member is coupled with said protrusion.

18. The image forming apparatus of claim 14, wherein said first member includes at least a beam-shaped portion, said first member is coupled with said protrusion through said beam-shaped portion, and said second member is in contact with said first member on the same side that said first member is coupled with said protrusion.

19. The image forming apparatus of claim 1, further comprising:
   a driving force transmitting member, being rotated by said driving source, for transmitting said driving force to said rotating body wherein said first member is fixed to said driving force transmitting member; and
   wherein a rigid protrusion is formed to a side surface of said rotating body and said protrusion is coupled with said first member of said driving force transmitting member.

20. The image forming apparatus of claim 19, wherein said driving force transmitting member comprises a driving gear.

21. The image forming apparatus of claim 1, wherein said first member is mainly composed of an elastic material selected from POM, ABS resins, SUS alloys, SECC, and aluminum alloys.

22. The image forming apparatus of claim 1, wherein said second member is an elastic material whose loss factor tan δ is not less than 0.3.

23. The image forming apparatus of claim 1, wherein said second member is composed of a viscoelastic material selected from EPDM, silicone gel, oil-impregnated porous rubber, butyl rubber, thermoplastic elastomer, and thermoplastic resin.

24. The image forming apparatus of claim 1, wherein said second member is in contact with said first member wherein said second member is compressed in advance with compressibility between 1% and 15%.

* * * * *